April 20, 1937.  M. M. WALDMAN  2,078,046
LAWN MOWER CUTTING BLADE
Filed April 6, 1935
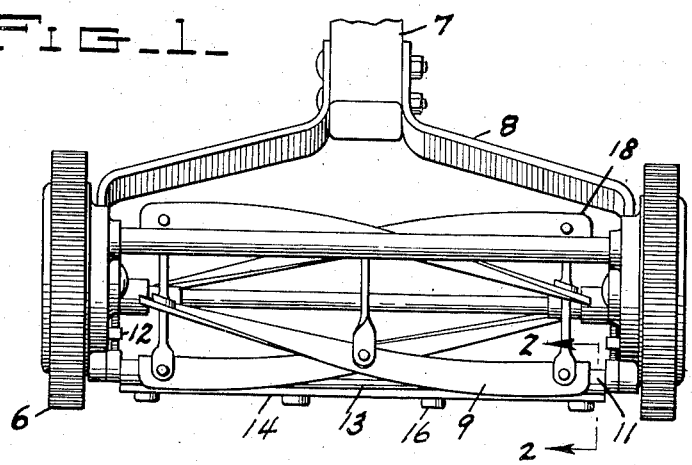
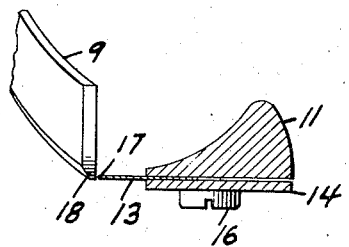 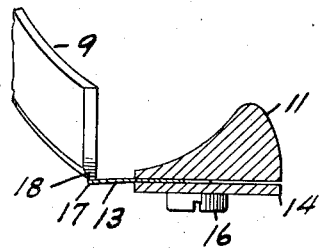
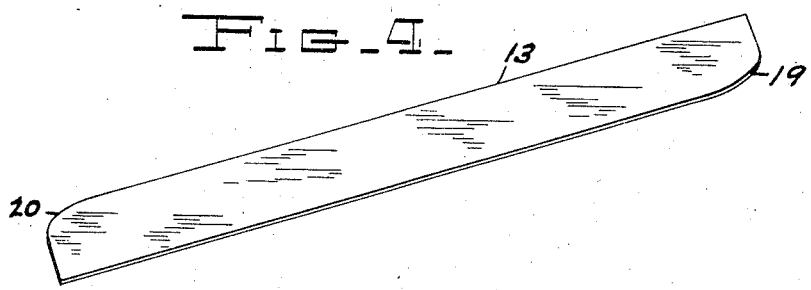
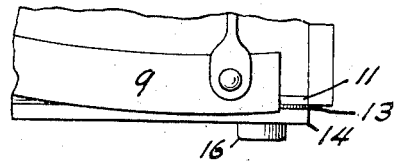
INVENTOR
MAX M. WALDMAN
BY
ATTORNEY Patented Apr. 20, 1937

2,078,046

UNITED STATES PATENT OFFICE 2,078,046

LAWN MOWER CUTTING BLADE

Max M. Waldman, Reading, Pa., assignor of one-half to Edward B. Regar, Reading, Pa.

Application April 6, 1935, Serial No. 15,020

2 Claims. (Cl. 56—294)

This invention relates to lawn mowers, and has special reference to that part of the apparatus which actually cuts the grass.

An object of the invention is to provide a cheap, simple and efficient device for keeping the rotary cutters sharp and to insure a good even cut of the grass blades over the entire width of the rotary cutting member.

A second object is to provide means which will both sharpen and keep sharp the rotary cutter.

A further object is to provide means practically indestructible for accomplishing the above objects.

A still further object is to provide means which can be quickly and conveniently attached to any form of lawn mower.

According to the invention the lawn mower, provided with rotary cutters and with the usual cutter bar support, has a flexible cutting bar secured on the support and has its outer edge within the circumferential plane of travel of the rotary cutters to provide that the rotary cutters may ride upon the outer edge of the flexible cutting bar. The forward end of each of the rotary cutters is rounded, or the cutting bar may have its end which is first contacted by the rotary cutters rounded so that they may ride onto said cutter bar and press the same out to the circumferential plane of their travel.

The drawing illustrates an embodiment of the invention and the views therein are as follows:

Fig. 1 is a front elevation of a lawn mower employing the invention and showing the operating handle broken away.

Fig. 2 is a vertical sectional view on the line 2—2 of Fig. 1 and shows one of the cutting blades about to come into contact with the cutting bar.

Fig. 3 is a like view showing the rotary cutter in contact with the cutting bar.

Fig. 4 shows a perspective view of a modified form of cutting bar.

Fig. 5 is an enlarged fragmentary front elevation of the mower, using the type of bar shown in Fig. 4.

While this invention is described in connection with a hand operated lawn mower shown in Fig. 1, the invention is not limited to any such type of mower, as any mower of any size and regardless of its operating power, if employing rotary cutters will fall within the scope of this invention.

The lawn mower illustrated in Fig. 1 has the traction wheels 6 operating handle 7 connected to the mower proper by the forked bars 8. The rotary cutters 9 may be of any number, and while but 4 have been shown on the present drawing, these are merely illustrative. The mower is provided with a cutting bar support 11, which extends between the traction members 6, and in the ordinary lawn mower the cutting bar is fastened to this support and its only movement is obtained through the regulating screws 12.

In the present invention the support 11 is utilized, having a flexible metal plate 13, which forms the cutting bar. This plate is clamped between the support 11 and a plate 14, and the set screws 16 hold the said cutting bar firmly in place.

This flexible plate 13 is formed of razor steel of such hardness that while maintaining cutting edges on the rotary cutters 9 it will not grind them away as would an abrasive.

The cutting bar 13 is so mounted between the support 11 and plate 14 that its outer edge 17 is normally within the circumferential plane of travel of the rotary cutters, so that when it is engaged by the cutters it will be deflected, as shown in Fig. 3.

The ends of the rotary cutters which first contact the cutting bar in the regular operation of the mower are rounded as at 18 so that they may ride onto the front edge 17 of the flexible cutting bar.

In case it is desired, the cutting bar 13 may have its end rounded as at 19 and 20 as shown in Fig. 4, in which case it will be unnecessary to round off the forward corners of the rotary cutters. This blade or cutting bar 13 in Fig. 4 has its two diagonal corners rounded, the purpose being for permitting the reversal of said bar in case the same would become worn, or its use might be required for another mower not previously equipped with a blade of this character.

It will be noted that every moving point of contact between a rotary cutter and the cutting bar 13 deflects the said bar so that there is no opportunity for any of the grass blades to escape severance when this type of mower is passed over the same. Actual demonstrations have shown that with a mower of the type herein described thin pieces of paper can be cleanly severed by merely holding the same between one of the cutters and the cutting bar and then gently turning the rotary cutter by hand.

With a lawn mower of this type the ease of operation is a great advantage over the operation of a mower in which the rotary cutters contact a rigid cutter bar.

With mowers now in use and equipped with rigid bars the bar may be removed, reversed and used in place of the plate 14, so that to incorporate in a present day lawn mower all the advantages of this invention it is only necessary to procure the flexible metal cutting bar 13, clamp the same between the support 11 and the reversed rigid cutting bar 14 and then either round the corners of the rotary cutters or round the forward corner of the cutting bar 13.

Of course the lawn mower herein illustrated may be modified and changed in various particulars without departing from the invention herein set forth and hereafter claimed.

The invention is hereby claimed as follows:

1. In a lawn mower having a series of rotary cutters and a cutter blade support, a binding plate secured to said support and having its edge adjacent the rotary cutters substantially coincident with the like edge of said support, and a stationary flexible cutter blade having one longitudinal side clamped between said support and plate.

2. A flexible stationary rectangular cutter blade for lawn mowers having rotary cutters and a support for said blade, said cutter blade having its top and bottom surfaces lying in single planes, said cutter blade having opposed cutting edges, and having one of the corners on one edge curved and the oppositely disposed corner of the other edges similarly curved.

MAX M. WALDMAN.